Feb. 2, 1960      S. G. REYNOLDS      2,923,773
ELECTRONIC SYSTEM FOR HANDLING INFORMATION
Filed Oct. 27, 1953      5 Sheets-Sheet 1
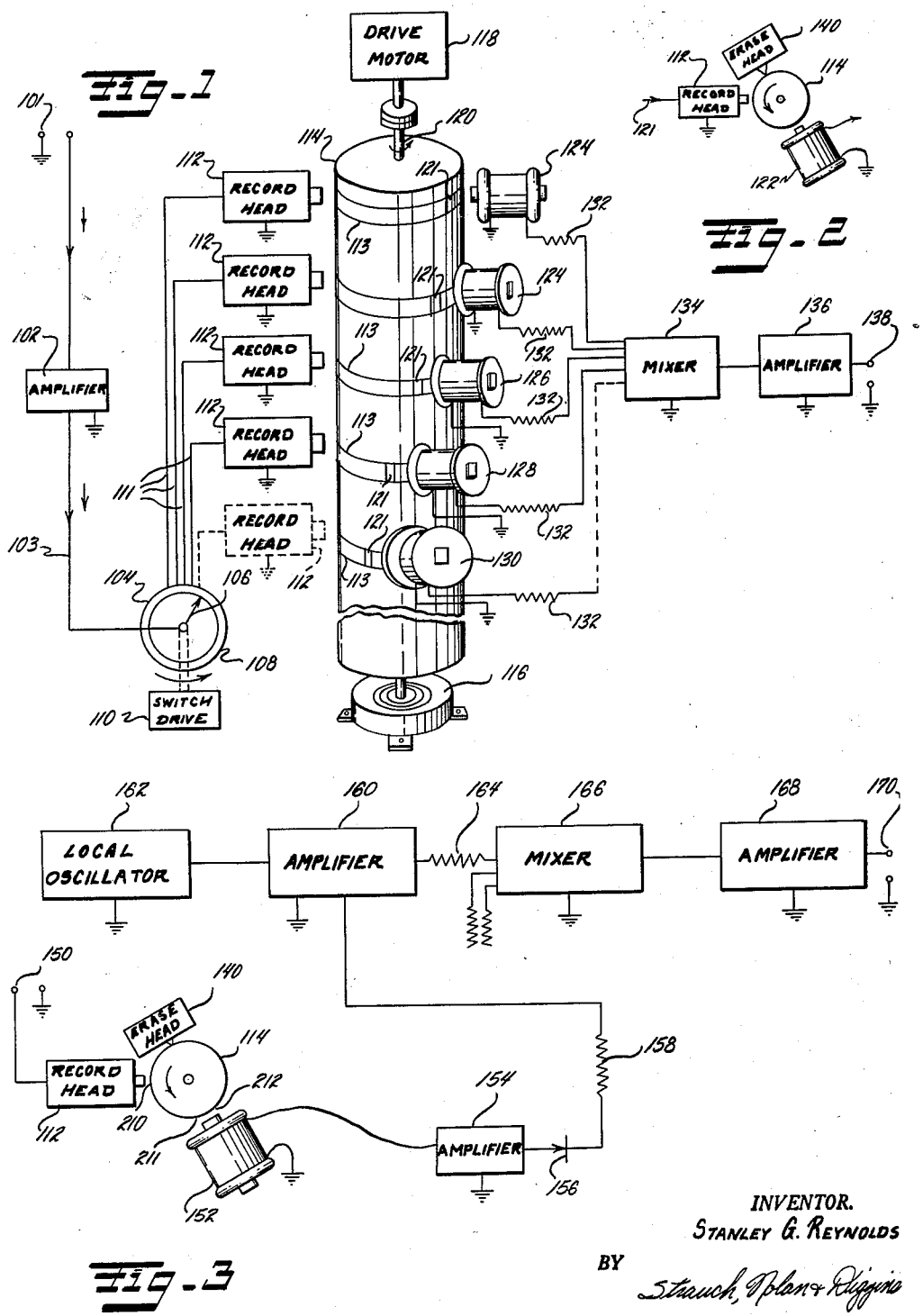
INVENTOR.
STANLEY G. REYNOLDS
BY
ATTORNEYS Feb. 2, 1960   S. G. REYNOLDS   2,923,773
ELECTRONIC SYSTEM FOR HANDLING INFORMATION
Filed Oct. 27, 1953   5 Sheets-Sheet 2
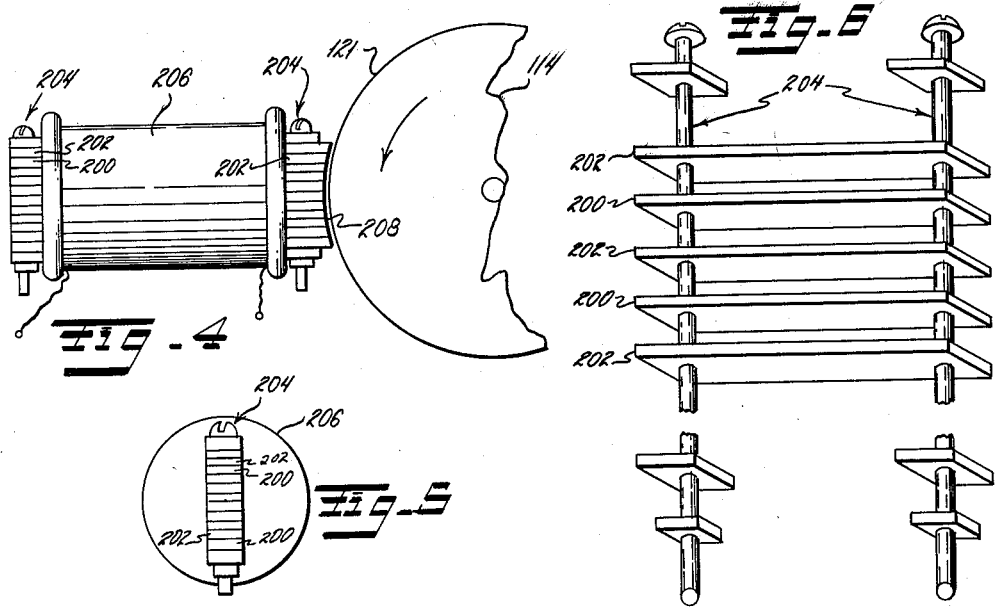
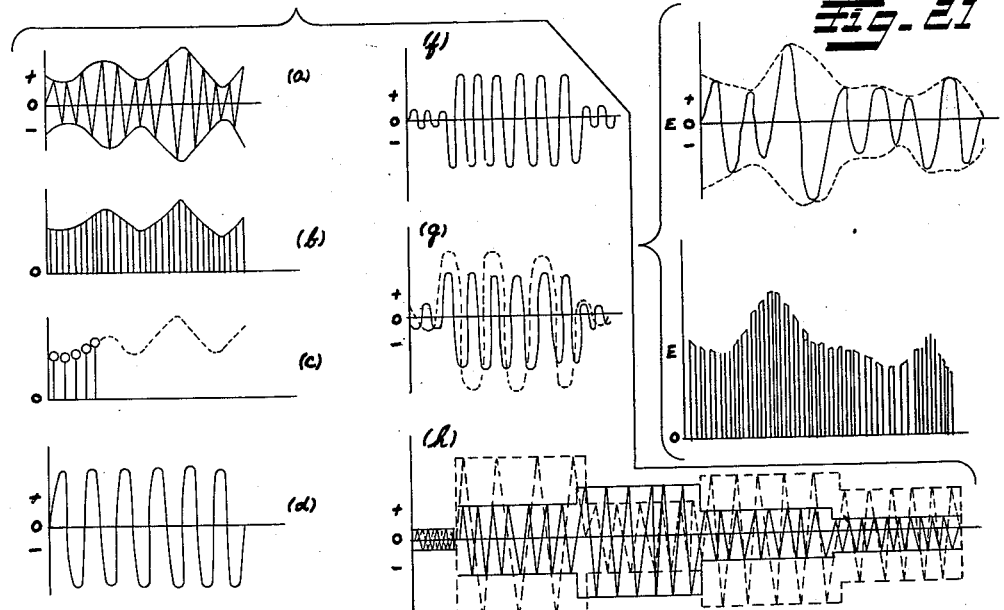
INVENTOR.
STANLEY G. REYNOLDS
BY
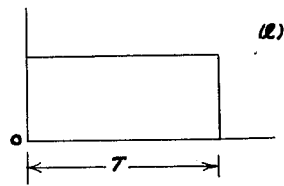
ATTORNEYS

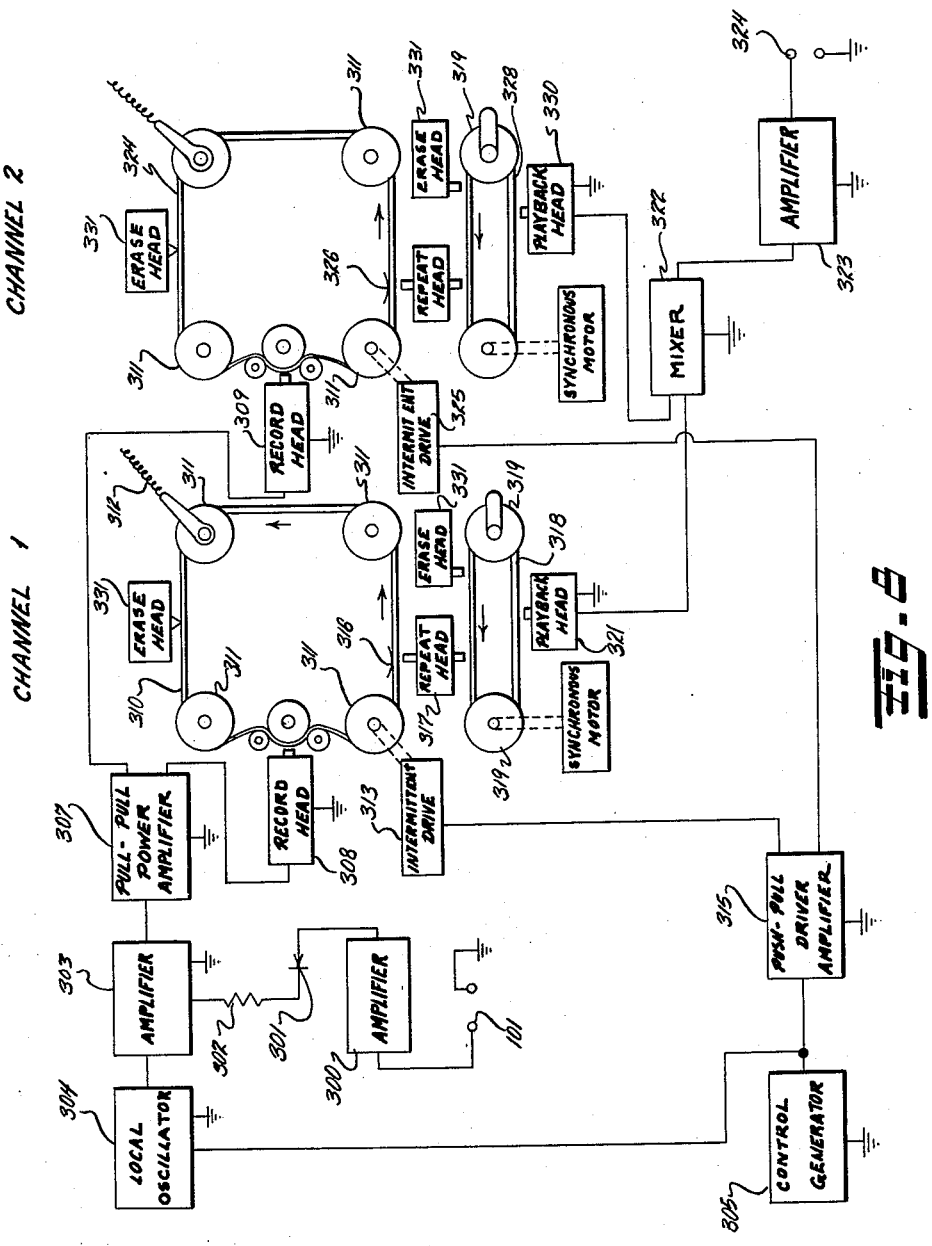

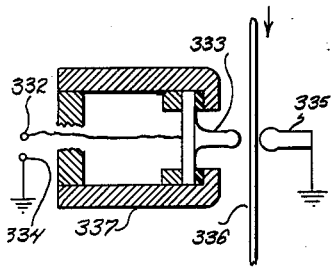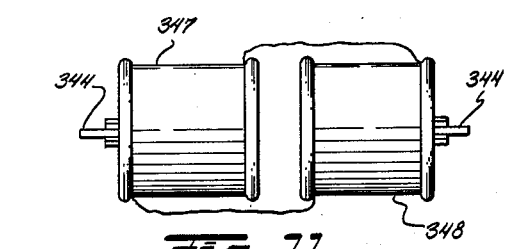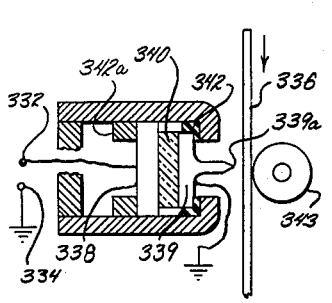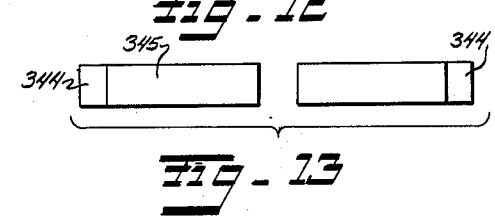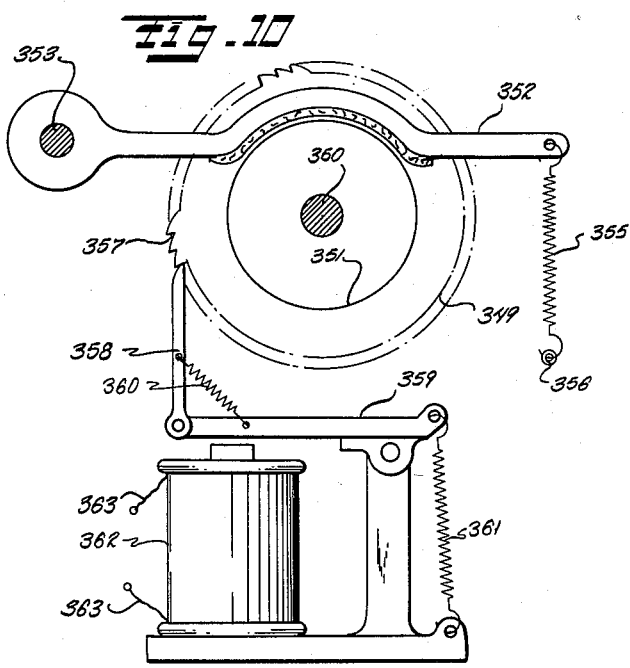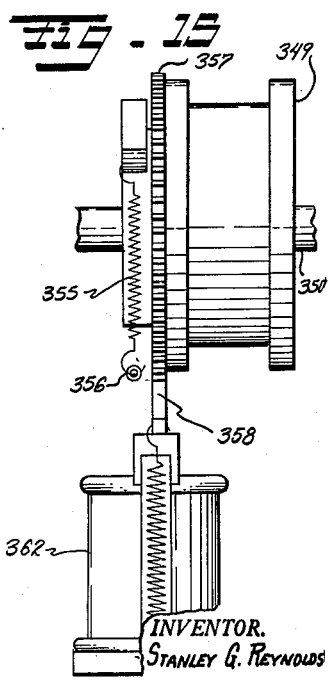

Feb. 2, 1960 S. G. REYNOLDS 2,923,773
ELECTRONIC SYSTEM FOR HANDLING INFORMATION
Filed Oct. 27, 1953 5 Sheets-Sheet 5
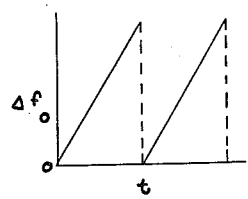
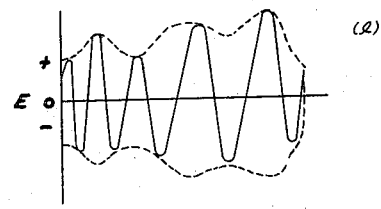
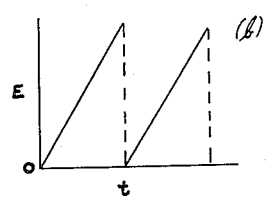
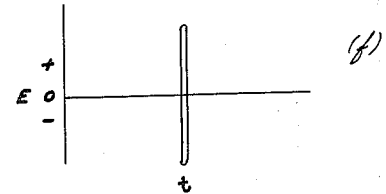
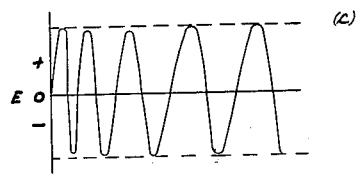
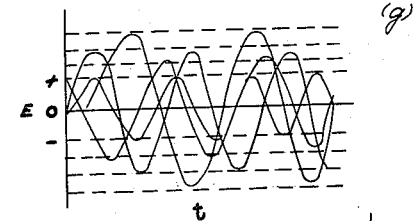
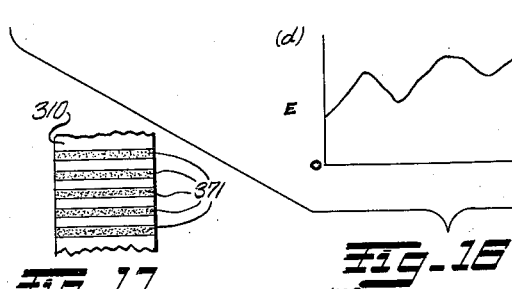
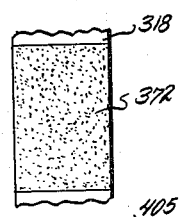
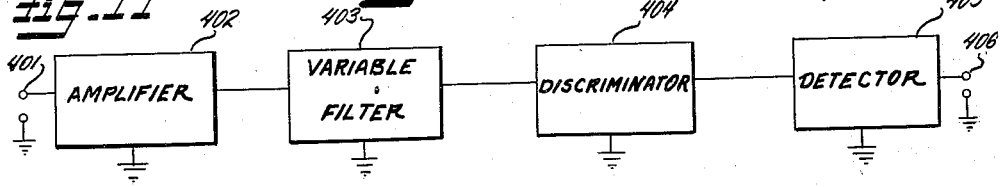
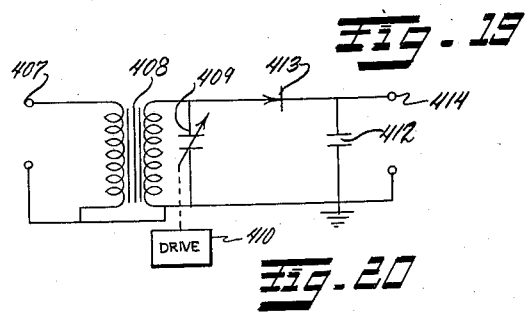
INVENTOR.
STANLEY G. REYNOLDS
BY
ATTORNEYS United States Patent Office 2,923,773
Patented Feb. 2, 1960

2,923,773

ELECTRONIC SYSTEM FOR HANDLING INFORMATION

Stanley G. Reynolds, Silver Spring, Md., assignor of one-half to Paul A. Wagner, Glencoe, Ill.

Application October 27, 1953, Serial No. 388,624

10 Claims. (Cl. 179—15)

My invention relates to methods and apparatus for handling information, and more particularly to methods and apparatus for handling a wide range of information occurring at a rapid rate, economically and with a minimum of equipment.

Heretofore techniques and instrumentation have been developed for converting information into electrical impulses, as in several systems of television wherein successive elements of light are converted into successive potential or current differences for the purpose of transmission by means of electronic facilities, and are caused subsequently to actuate a reproducing mechanism in order to produce a facsimile of the original information.

In such systems the rate of change between successive elements or groups of carrier elements, is by definition the frequency of the flow of information, and electronic equipment designed to handle information is required to conduct with uniform efficiency at a frequency equal to the maximum rate as well as at lower and the lowest rate at which information impulses are to be conducted. The rate of change between successive elements of information in one present widely used system of monochrome television requires equipment which is capable of uniform amplification between the frequencies of 30 and 4,500,000 cycles per second. Another known system for use in the transmission of color television signals has a uniform frequency response requirement between 30 and 10,000,000 cycles per second.

Equipment for the transmission of information at high frequency rates is often complex and inefficient in its conducting characteristics, is difficult to maintain in adjustment, and is costly because the electrical components used in its construction must be efficient over a wide frequency range. In addition, the radio transmission of such information requires a radio frequency channel so broad in terms of the band-width of radio frequency response that allocation of suitable transmission channels is in the region of the electromagnetic spectrum least susceptible to long distance transmission, thus effectively limiting such radio transmissions to receiving locations within approximately line-of-sight of the transmitting location. Further, many present facilities for transmission or storage of information, such as common carrier telephone lines and phonograph recordings, are not efficient in accepting and reproducing information at rates above approximately 10,000 cycles per second. Therefore overland transmission of information at high rates of change requires the use of specially designed transmission lines which are costly to construct and maintain, and are limited as to the multiplex transmission of information, while the storage through recording of information is at present limited to costly and complex equipment whose economic value has not been demonstrated, or to systems of storage other than electronic.

The main object of my invention is to provide novel methods and apparatus for conducting information occurring at wide rates of change through electronic circuits at low frequency rates and subsequently creating a facsimile of the original information.

Another object of my invention is to provide novel methods and apparatus in which information which has been converted into electrical impulses may be oriented and encoded to form a complex signal, the repetition rate or frequency of which may be a fractional part of the repetition rate or frequency of the original information, and the complex signal is subsequently decoded and the original information is reoriented for appropriate recognition and service.

A further object of my invention is to provide novel methods and apparatus for combining electrical elements of information from a multiplicity of sources in a complex signal through an encoding system which will permit low frequency transmission of the complex signal which may be reduced subsequently to properly oriented and recognizable elements or facsimile counterparts of the original information.

An additional object is to provide novel methods and apparatus for converting electrical elements representing successive elements of information, into a complex low frequency signal representing a controlled mixture of the original elements of information, for the purposes of transmission or storage by means of numerous common carrier or recording systems.

It is also an object to provide novel methods and apparatus for converting low frequency electrical signals containing a complex mixture of electrical impulses into successive electrical impulses.

A further object is to provide novel methods and apparatus for converting electrical signals containing a complex mixture of electrical impulses into one or more simultaneous trains of electrical impulses.

Another object of this invention is to provide novel methods and apparatus for substantially reducing the band-width necessary at present in the high frequency radio transmission of information, by the simultaneous transmission of numerous impulses of electrical information.

A further object is to provide novel methods and apparatus for orienting and encoding information which has been converted into successive electrical impulses to form a complex impulse, the frequency of which may be a fractional part of the frequency of the original information.

It is also an object to provide novel methods and apparatus for reducing and dividing a complex signal which consists of a multiplicity of simultaneous encoded electrical impulses, into a series of successive impulses or into a series of impulses occurring simultaneously but without mutual interference.

Another object is to provide novel methods and apparatus in which successive electrical elements are caused to modulate the amplitude of a sub-carrier whose frequency is constantly varying to provide an amplitude modulated variable frequency sub-carrier, successive elements of which are delayed by means of a delay circuit adjusted to provide a series of complex wave trains consisting of a mixture of amplitude modulated waves differing in basic frequency characteristics.

An additional object is to provide novel methods and apparatus in which a low frequency complex wave consisting of two or more simultaneous impulses differing as to basic frequency may be separated at a rapid rate to provide successive electrical elements whose frequency may be at a considerably increased rate over that of the complex wave.

Another object is to provide novel methods and apparatus in which successive electrical elements are caused to amplitude modulate or create successively separate sub-carriers differing from each other in frequency, each of which is delayed for successive lengths of time to provide a mixture of amplitude modulated wave trains in the form of a complex signal containing simultaneous amplitude modulated elements differing in basic frequency.

A further object is to provide novel methods and apparatus for dividing a complex signal consisting of amplitude modulated elements differing in basic frequency into successive or simultaneous basic frequency elements, which are then in turn demodulated to provide non-interfering elements of electrical energy, for use in an external circuit.

Another object is to provide novel methods and apparatus in which simultaneous elements of different basic frequency in a complex signal may automatically be selected and separated into individual separate channels, or automatically selected and delivered in sequence to an external circuit.

These and other objects of my invention will become increasingly apparent when the following specification and claims are read in connection with the accompanying drawings, wherein:

Figure 1 is a diagrammatic illustration of one form of one of the basic systems of the present invention for converting information with a high repetition rate into a low frequency signal;

Figure 2 is a plan view of a component of the system of Figure 1;

Figure 3 illustrates a modification of the system of Figure 1;

Figures 4, 5 and 6 are enlarged views of components of the systems illustrated in Figures 1 to 3;

Figure 7 illustrates graphically the electrical form of signals at specific points in the system of Figures 1 and 3;

Figure 8 is a diagrammatic illustration of one form of an alternative basic system of the present invention;

Figures 9 through 13 are enlarged views of alternative forms of certain of the components of the system of Figures 1, 3 and 8;

Figures 14 and 15 are enlarged views of a major component of Figure 8;

Figure 16 illustrates graphically the electrical forms of the signal at various points in the system of Figure 8;

Figures 17 and 18 illustrate pictorially the form of the magnetic recording at two points in the system of Figure 8;

Figure 19 is a block diagram of a receiving and decoding system applicable to the two basic systems shown in Figures 1, 3 and 8;

Figure 20 is a simplified schematic diagram of a playback system utilized with the apparatus of Figure 19; and Figure 21 illustrates graphically the electrical forms of the signal at specified points in the conversion system of Figures 19 and 20.

For purposes of illustration the present invention will be disclosed in connection with the recording and playing back of television picture signals, although the invention is of much broader scope and has many other applications. For example, the invention is suitable for the multiple transmission of facsimile signals or for color facsimile transmission, or for handling information such as multiple telegraph signals, or sound signals. Certain aspects of the invention may also be applied to electronic calculators and computers, in telemetering systems, and in numerous other problems and techniques concerned with handling information. Many different applications are suggested which indicate that the present invention has broad utility entirely aside from a very wide application in the field of monochrome and color television.

Television, basically, is a system for handling information, and in this regard its objective is the same as in many other systems for handling information, such as audio facilities, telegraph systems, signal lights, et cetera. The differences which exist between basic systems are related primarily to the type of information to be conveyed and the speed of its transmission. Insofar as electronic transmission is concerned it is evident that an original source of information must first be converted into electrical form before it can be handled electronically, and the systems for handling such electronic information may differ by substantial degrees.

The complexity of modern television is related primarily to the requirement for proper reorientation of the original signal source of light. The television eye (camera) "sees" in rapid sequence one segment after another of the scene which is subsequently to be reproduced. The rate at which the television camera "sees" each segment of the picture, is the rate at which it is necessary for the camera tube to switch from one segment to another in order subsequently to permit reproduction of a facsimile of the original scene and to maintain the motion in a changing scene.

Present standards for monochrome in the United States require that a television picture contain 525 horizontal lines, each line containing 300 segments, and each complete frame or picture of a scene to be reproduced (scanned) 30 times per second. The television camera thus becomes a mechanism whereby a multitude of light-sensitive cells are subjected to a complex electronic switching system wherein 300 points of light in a scene are viewed consecutively in 525 lines, 30 times per second, resulting in a nominal repetition rate of 4,725,000 per second for individual points of light in a given scene. Considering that the camera also has to take some of this time to switch from line to line and from frame to frame, the total repetition rate is somewhat reduced and as a practical matter a rate of 4,500,000/sec. is considered satisfactory, while some commercial systems operate at approximately 4,000,000/sec. and some further loss in picture fidelity is considered tolerable if the rate is reduced to around 3,500,000/sec.

Where interlaced scanning is employed to reduce flicker effects the lines are scanned alternately so that the field is scanned twice to produce each complete frame. In such a system the scanning frequency is twice the frame frequency although the repetition rate of the individual points of light is unchanged.

The electrical signal resulting from a television camera "pickup" of a picture of scene, consists not only of a train of consecutive individual electrical impulses which correspond to the original light intensities of the segments of the picture or scene. In addition, interspersed at appropriate intervals, "control" signals are introduced at the camera chain system which precisely determine the orientation of the picture information. The television signal thus conveys, in sequence, all of the information needed by the reproducing system to define, orient and re-create a facsimile of the original picture or scene.

From the foregoing it is apparent that television as it is now known has three major dimensions as contrasted with the two major dimensions of sound. Whereas sound has tone (frequency) and loudness (amplitude), the television signal consists of color variation (frequency), brightness (amplitude), and rapid consecutive placement or position of individual picture elements or controls resulting in speed of exposure (repetition rate). Of these three parameters, the repetition rate is the most important insofar as it relates to television recording.

A standard sound recorder of the disc-record type is capable of providing reasonable fidelity of sound over a range of 100–8,000 c.p.s., while a high quality tape recorder will extend these limits to approximately 30–15,000 c.p.s. Special recorders of the moving magnetic tape variety now make possible responses substantially uniform to 100,000 c.p.s. However, it seems clear that quency signal, demodulation and sampling during the time interval, T, is conducted in series in accordance with the original order of encoding, thus providing an electrical signal whose characteristics are identical to the original signal prior to encoding.

Referring now more particularly to Figure 1 of the drawings, a simplified diagram is there shown which illustrates the basic principles of the present invention.

It will be clearly understood that Figure 1 has been prepared in simplified form primarily in order to provide the basis for a clear understanding of my invention, and that several other mechanical and electrical techniques exist which are capable of achieving the same results in connection with the principles illustrated.

The information to be handled, after conversion into an electrical signal is supplied to the apparatus of Figure 1 at 101. The input signal, which as stated above may assume many different forms is externally generated by other systems not claimed as a part of my invention. For purposes of illustration, however, this signal will be assumed to consist of consecutive impulses of electricity varying in amplitude and occurring at a high average repetition rate, such as the signal from a standard television camera, a facsimile transmitter, an audio preamplifier, or similar equipment.

In general, the apparatus of Figure 1 breaks up the signal of high repetition rate and converts it into a series of signals of different frequency which are then mixed together to form a complex signal containing in reoriented form all of the information of the original signal but in a low frequency form.

The external signal supplied at 101 is first amplified by an amplifier of conventional design, 102, to a strength sufficient for use in the system, and is then conducted through lead 103 to a sequential switch 104 shown in Figure 1 as a mechanical rotary switch whose moving arm 106 is actuated by a shaft, 108, driven by a motor or rotary solenoid 110. The switch 104 connects the output of the amplifier 102 through suitable leads 111 in rapid sequence to a number of separate magnetic recording heads 112, each of which in turn then records its portion of the signal in magnetic form on separate record channels 113 on a magnetic record and delay drum 114. The number of switch contacts may be equal to the number of recording channels, in order that one revolution of the switch will result in one impulse each being conducted in sequence to each recording channel. Alternatively, the switch 104 may be so wired that two or more signal sequences may be conducted to the recording channels for each rotation of the switch.

The magnetic record and delay drum 114 consists of a suitable cylindrical drum mounted in a suitable bearing assembly 116 and is rotated by means of a drive motor 118 in one direction in normal operation as shown by the arrow 120. An intermittent drive may also be employed. The outer surface of the drum 114 is magnetically sensitive, either by virtue of its construction from magnetic material such as steel, or by means of a coating of magnetic particles suspended in colloidal form in a plastic binder as is the case in certain well known processes used in coating magnetic tape for magnetic tape recorders. The recording heads 112 are vertically aligned and since they record sequentially on the rotating drum 114, the recorded signals, indicated at 121, will be displaced circumferentially on the drum 114 as shown.

As the drum 114 rotates in the direction shown, the recorded signal 121 is caused to pass by a magnetic generator to be described in detail subsequently. Each recording channel utilizes a separate magnetic generator, shown in Figure 1 designated as 122, 124, 126, 128 and 130, so constructed that each generator is sensitive to the magnetic field created in its individual channel by the recorded signal and repeats its sensitivity a number of times as the recorded signal passes by it, thereby producing an alternating voltage of greater time duration than the original recorded signal. Each magnetic generator 122—130 differs slightly in its construction in a manner to be explained in order that its output voltage will differ as to frequency in sequence from the others in the system. In addition, each magnetic generator 122—130 is so oriented physically that rotation of the drum 114 will cause each consecutive recorded signal 121 located in consecutive channels, to influence its respective magnetic generator at and during the same interval of time. The outputs of the magnetic generators are then conducted through isolation resistors 132 to a conventional mixer circuit 134 and a conventional amplifier 136, whose output, indicated at 138, will contain a complex low frequency signal consisting primarily of the amplified sum of the outputs of the magnetic generators. Since each generator differs in the frequency of its output, and since each is actuated by a separate portion of the original input signal in sequence, and since, in addition, each generator is so oriented with respect to the others as to be activated at and during the same time interval, the output signal 138 will consist of a mixture of voltages differing in frequency and in amplitude, representative of a sequential segment of the original signal for a single sequence of generator activation.

After the recording head 112 records its impulse on the drum 114, and after the drum has rotated to carry the recorded signal past the associated generator, the recorded signal is then erased by an erase head 140 (Figure 2) of conventional design in order to clear the record track for the next impulse sequence to be recorded.

It will be understood that a separate erase head 140 is provided for each of the channels 113. The additional heads have been omitted from the drawings for clarity.

Referring again to Figure 1, the number of stationary contacts on the switch 104 will be determined by the number of channels 113 and recording heads 112 used in the system so that in a given rotary movement of the switch each channel will receive one impulse.

It will be understood that the switch 104 need not be of mechanical design but could be constructed as an electronic switch in accordance with well known principles of design in the electronics field. Alternatively, this switch could be constructed in accordance with well known principles of electro-mechanical design whereby the moving arm would not make contact with the switch segments but would act as one side of a capacitor with respect to the stationary contacts and thus transfer energy by electrostatic induction. It will be further understood that the function of the switch 104 would be performed by certain other well known techniques such as by means of a series of relays actuated in sequence to transfer energy from the amplifier 102 to the recording channels 113.

The apparatus of Figure 1 has been shown as having 4 major channels, with a fifth channel shown in dotted lines to indicate additional channels. Since by definition the generators 122, etc. are so oriented that they are sensitive to their respective recorded actuating impulses at and for the same time interval, it follows that as soon as the last recording head in sequence has recorded an impulse, the next signal sequence may begin with the first recording head in sequence. It is, therefore, practicable and desirable that the drum 114 be so constructed that it can accommodate a plurality of signal sequences, and this is accomplished by increasing the diameter of the drum without changing the physical dimensions or orientation of either the recording heads 112 or of the generators 122, etc.

The signal handling capacity of the system shown in Figure 1 thus will depend upon the number of channels, the diameter and speed of the drum 114 or its equivalent, the switching rate of the switch 104, and the desired rate of change in the output signal. Assuming a desired output signal on the order of 6000 complex sequences per second, and assuming 600 channels are constructed and oriented available commercial recording equipment can hardly be expected without substantial revision to provide uniform response to a signal such as a television signal with a repetition rate capability of 4,500,000 c.p.s.

The frequency response of the recording system is a function of the speed of the recording medium and the response capability of the recording mechanism. It is possible to visualize ways of improving the latter, but increasing the speed of a record or of a tape means that ultimately practical limits are reached, and in no case does it appear practicable to approach a 4.5 mc./sec. system response within reasonable limits of speed, size of disc or reel of tape. In addition, increased speed of equipment poses some very real problems from the standpoint of safety in use and maintenance of bearings, motors and associated parts.

My invention was conceived as an alternate to the redesign of present recording equipment, by providing instead a new and further orientation of information such as is presented by a television signal, in order that the new orientation might be susceptible to recording, handling and playback by conventional and preferably inexpensive means.

Fundamentally the present invention provides methods and apparatus for converting information such as is contained in a television signal, into a complex low frequency signal which is then capable of being recorded, transmitted by telephone lines or other common carriers such as radio transmitters, and at the receiving end can be returned to its pre-conversion state for appropriate delivery of information as is the case when a television signal is displayed on the screen of a cathode ray tube and reveals a picture or scene.

In its broader aspects the present invention is capable of handling any information having the following characteristics:

(a) The information will first have been converted into an electrical signal.

(b) This electrical signal will consist of consecutive impulses of energy.

(c) Each impulse will have an electrical amplitude fixed within arbitrary limits between minimum and maximum as related to the system.

(d) The amplitude of each impulse may vary in accordance with the requirements of the information source.

(e) The time of duration of each impulse may vary as required by the information source.

(f) The repetition rate may vary (no two sequences are required to contain the same number of impulses).

The maximum repetition rate per second will determine the overall response characteristics required of any system for handling this information.

Information meeting the above definition is converted into and handled as a complex audio-type low frequency signal, and returned to its pre-conversion state.

In the conversion systems to be described, the primary objective is to provide a resultant signal which may be described in terms of the following parameters:

(a) The resultant signal will consist of a series of "bursts" of electrical energy.

(b) The number of bursts per second (burst rate) will be at a low frequency rate determined by the upper frequency limits of the system vehicle.

(c) The burst rate will not vary.

(d) Each burst will contain one or more elements of alternating current energy.

(e) Each burst will contain the same number of elements.

(f) The product of the burst rate and the number of elements per burst will be equal to the maximum repetition rate of the information to be handled by the system.

(g) Each element (within a burst) will consist of a different fundamental frequency element of alternating current.

(h) Each element within a burst will correspond to a consecutively different time of occurrence, and will in turn be represented within a burst in terms of a progressively differeing frequency of alternating current.

(i) Each burst will contain the same progressive configuration of alternating current impulses.

(j) Each element within a burst will have been so oriented as to occure at the same time within the burst.

(k) The amplitude of each element will have been fixed within arbitrary limits between maximum and minimum, but the minimum amplitude will be held by the system above the noise (and residual harmonic interference) level.

(l) The amplitude of each element will correspond between minimum and maximum with the amplitude of the information signal and will have been so modified by it.

(m) Each complete burst will have been delayed as to time of total existence by a time equalling the sum of the original times of occurrence of the elements within the burst.

The systems for returning the above complex signal to its pre-conversion state provides the following:

(a) The incoming low-frequency burst signal is amplified by suitable low frequency amplifying equipment.

(b) It is then conducted to an automatic and continuously tuned filter circuit which in turn removes the progressively differing elements of fundamental frequency contained within the burst.

(c) The output of the continuously tuned filter is conducted to a detector of conventional design whose output provides impulses of voltage corresponding in amplitude to the alternating current elements as they are removed from the burst in the storage circuit. The detector output provides elements corresponding to the original information signal, for appropriate use in external circuitry.

Briefly, my invention undertakes to encode high-frequency electrical information into a complex low-frequency form for handling by conventional common carrier or recording techniques in widespread usage, and subsequently to decode this complex low-frequency signal into its original high-frequency form.

The signal to be encoded is treated, according to one embodiment of the invention, in successive equal time intervals, $t$. Each time interval, $t$, consists of a series of signal elements, $n/t$, which are caused to be separated, delayed in sequence, and oriented in parallel, time-wise. Each of the parallel elements, $n/t$, is then caused to actuate a separate low-frequency generator, each generator operated at a different fundamental frequency during the total time interval, $t$. The outputs of the several generators are then combined to provide a complex low frequency signal, each element of which is of a different frequency whose amplitude identifies the characteristics of the original signal element, $n/t$, in each case for an elapsed time, $t$. According to my invention, successive time intervals, $t_1$, $t_2$, $t_3$, etc., consist of a continuing repetitive mixture of low-frequency signals, but the amplitude varies in successive time intervals, conveying the changing characteristics of successive series of signal elements, as they occur in the original signal prior to encoding. By suitable selection of circuit parameters such as the time interval, $t$, the frequency of the generators, and the number of signal elements, $n/t$, the resultant low-frequency signal can be tailored for optimum operating conditions in a specific application.

For decoding the signal which has been handled, the complex low-frequency signal is subjected to a suitable filter system whereby the low-frequency components are separated and are then demodulated and sampled in series during a time-interval, T, which is equal to the original time interval, $t$, used in the encoding process. Since the original information from each element, $n/t$, is present in terms of the amplitude of its corresponding low-freso as to provide the complex sequence for each .006 second; assuming rotational speed of the drum 114 to be 30 revolutions per second (1800 r.p.m.); assuming the diameter of the drum 114 relative to the radial length of the generator elements, 122, etc. to be sufficient to accommodate 200 recorded elements 121 per channel per revolution; then the input signal which can be accommodated by the system will have a maximum repetition rate of 3,600,000/sec. although the system will accommodate any lower rate or variation thereof.

It will be noted that the principal factors to be considered in the system of Figure 1 are the desired output rate or output frequency versus the input signal rate as related to the number of impulses recorded per revolution of the drum and the number of channels available. Any change in one of these factors will require change in the other parameters of the system. A simple increase in rotational speed of the drum 114 will increase the output frequency, while a decrease in the rotational speed of the drum 114 will decrease the output frequency, but will require that the diameter of the drum 114 be increased in order to accommodate additional sequences of signals from the switch 104 assuming no increase in the input signal rate.

It will be understood that instead of a drum 114 the system could make use of an endless tape or a series of endless tapes so mounted as to perform the same function as shown in Figure 1 and in the above descriptions.

It will also be understood that while Figure 1 shows the magnetic generators 122, etc. physically so oriented with regard to the sequence of recorded impulses 121 that "playback" or generator action occurs simultaneously for all generators and for the same time interval, the result can also be accomplished if the generators are all oriented parallel to the axis of the drum 114 and the recording heads 112 are then physically oriented so as to take account of the rotation of the drums and record in sequence in such a manner as to provide the recorded sequence of impulses in a line parallel to the axis of the drum 108. Alternatively both the recording heads 112 and the magnetic generators 122, etc. could be so located in juxtaposition with each other as to provide a means of delaying the transmission of individual elements of the signal sequence from the switch 104 in order to provide the the physical stimulus for simultaneous mixture and further transmission of the converted signal sequence.

It should be further understood that the parameters stated above are chosen arbitrarily for purposes of example and are not necessarily those which would apply in specific applications of my invention. A specified input frequency range encountered in service could require a maximum specific output frequency of the system commensurate with other external circuitry requirements and these factors would in turn require a different number of channels, speed of rotation of the drum 114, the switch 104 and the other system parameters discussed above. However, in general to be consistent with the major intent of my invention, the output signal 138 would have a nominal frequency in the audio frequency range in order to be applicable to recording or transmission by means of common carrier facilities available external to my system invention. This factor will therefore determine to a large extent the number of channels necessary to the system commensurate with the repetition rate of the desired input signal to be handled by the system.

One further aspect of the invention thus far described should now be understood. Assuming an equipment as shown in Figure 1 is constructed with an output frequency of 6000 "bursts" or complex signal mixtures per second, a similar equipment can be constructed with an output frequency of 3000 "bursts" per second and the two outputs so synchronized and mixed by means of well known techniques whereby the resultant complex signal would consist of 3000 as well as 6000 cycle components which are susceptible of subsequent separation by simple filters but which would not prevent transmission of the mixed signal either by mechanical storage (recording) or common carrier facilities in the external circuitry. This indicates the inherent possibilities of the invention for providing either from one high frequency source or from several sources a means of developing a low-frequency signal for purposes of easy and economical transmission in external common carriers or recording media.

Figure 3 incorporates certain details of the form of the invention described in connection with Figure 1 and in addition shows an alternative system partially applicable to the system of Figure 1. Referring to Figure 3, a single channel is analyzed for simplicity of description instead of a plurality of channels as is shown in Figure 1, although it will be understood that Figure 3 refers to a system requiring the same number of channels and circuit parameters as are shown in Figure 1. The impulse input signal applied at 150 is the same impulse signal as is conducted by the switch 104 in Figure 1 to the recording heads 112 which is shown also in Figure 3. In addition the delay drum 114 and the erase head 140 in Figure 3 are identical to the same units in Figure 1. The magnetic generator 152 in Figure 3 is similar in general design to those previously described but in the instance shown in Figure 3 each generator 152 used is identical for each channel of the overall system, and its output signal is conducted to the amplifier 154 whose output is rectified by a rectifier 156 and filtered by the resistor 158 to provide bias voltage to control the amplification of the amplifier 160 which under normal, no-signal conditions is non-conductive or semi-conductive. Connected to the input of amplifier 160 is a local oscillator 162 whose output is of fixed frequency but restricted in amplitude by the amplifier 160. When an impulse signal is recorded on the drum 114 by the recording head 112 and has actuated the magnetic generator 152 and is amplified at 154, rectified at 156, and filtered at 158, it then causes the amplifier 160 to amplify the output of the local oscillator 162 conducting the resultant signal through the isolation resistor 164 to the mixer 166 and the amplifier 168 to the output and external load 170 similar to the output signal as shown and described previously in connection with Figure 1.

In the system outlined in Figure 3, the local oscillators 162 of successive channels are tuned to progressively different low frequencies in order that the mixture of channel outputs in the mixer 166 may preserve the identity of the information in the individual signals conducted through the separate channels.

Basically the alternative treatment of Figure 3 is more complex than the basic system of Figure 1 but applicable to the general description of circuit operations, parameters and capabilities as previously expressed in connection with Figure 1. There are certain inherent advantages particularly in that signal levels in the post-delay portion of the system (subsequent to the output of the generator 152) can be controlled for certain specific applications consistent with adjustment of the individual channel signal output level.

Figure 3 also shows in plan view the relationship between the point 210 of impulse recording, the point 211 of magnetic generator activation, and the point 212 which the generator ceases to function for each recorded signal impulse. From this illustration it will be clear that the recorded impulse is delayed for the necessary time to provide orientation for subsequent simultaneous action of the generators from all channels in the system, and then activates the magnetic generator to provide an alternating voltage for a time duration greater than the original recorded impulse time.

Figures 4, 5 and 6 illustrate the preferred form of the magnetic generator in greater detail. In Figure 4 the assembled magnetic generator is shown as oriented relative to the magnetic record and delay drum 114 shown in partial plan view. A series of soft iron plates 200 or other material of low magnetic rententivity are separated from each other by insulators 202 in a laminated magnetic system widely used in alternating current applications. A "stack" of such alternate laminated plates is held together by means of a suitable clamping system indicated generally at 204 and the whole is surrounded by a coil of insulated wire 206. The general configuration of this component is shown in an end view in Figure 5. In addition, Figure 4 shows the magnetic generator to be so constructed as to be concave along the radial area 208 adjacent the drum 114 in order that the ends of the plates 200 may be maintained uniformly distant from the drum 114. This feature of the construction is not unique to the invention but is shown here only to emphasize the necessity that the ends of each of the plates 200 in the "stack" should be equally distant from the recorded signal.

In operation the recorded impulse 121 is rotated past the ends of the laminated plates 200 of the generator, alternately creating a magnetic disturbance at the end of each magnetic plate as it passes by, being ineffective during the time of passage by the insulating sections 202 of the lamination. Each time a magnetic plate is thus activated, the coil 206 is cut by magnetic lines of force from the magnetic plates 200 and an electrical impulse is generated as long as the signal impulse 121 is in the field. A magnetic impulse will occur each time the recorded impulse passes by the end of a magnetic plate 200. By stacking a series of plates insulated from each other and mounting the unit in the manner shown, an alternating voltage will be developed in the coil 206 by the recorded impulse 121 and its frequency will be determined by the number of plates 200 as well as by the speed of rotation of the drum 114. By varying the number of magnetic plates 200, but maintaining the radial thickness or length of the laminated "stack," either by different thickness of plates 200 or insulators 202 it is possible to construct magnetic generators for use in the application shown in Figure 1 whereby each generator will vary as to output frequency. Alternatively, all generators in the system may be constructed with the same number and thickness of plates, to provide uniform frequency of output in all channels for use in the system of Figure 3.

It will be understood that the physical configuration of the generator shown in Figures 4, 5 and 6 may be varied as to actual construction, there being many widely known and established techniques for the design of laminated plate core designs in transformers and associated components used in electrical service.

Although the generator above described in connection with Figures 4, 5 and 6 makes use of well known principles, it is believed to be unique in its application herein in that it is actuated by an impulse magnetic recording whose motion relative to the generator causes a varying magnetic disturbance which in turn gives rise to the generation of an alternating voltage whose amplitude will be proportional to the strength of the magnetic recorded impulse field. Because of the manner of mounting the generator along the circumference of the drum 114 it provides a means for increasing the time of duration of the voltage resultant.

Referring to Figure 7, several graphs are there shown which indicate the electrical form of the signal at specific points in the apparatus shown in Figures 1 and 3.

Figures 7(a) and 7(b) show graphically the types of input signal which may be connected to the input 101 of Figure 1 or the input 150 of Figure 3. Figure 7(a) shows an alternating voltage signal whose amplitude varies over a given time interval, $t$, shown herein as a common denominator in the several graphs. Figure 7(b) shows a direct current signal whose amplitude also varies with time. In all of the graphic instances shown, amplitude is plotted on the vertical plane while time, $t$, is plotted in the horizontal.

Figure 7(c) indicates graphically how the switch 104 in Figure 1 breaks up the input signal into successive elements of voltage each of which is conducted to a separate recording head 112, and creates a magnetic recording, the strength of which will be proportional to the impulse amplitude of the voltage element. While Figure 7 (c) applies to direct current, the principles outlined are equally applicable to alternating current.

Figure 7(d) is a graph of an alternating voltage produced by a single magnetic generator, for example 122 of Figure 1 or 152 of Figure 3. The amplitude of this voltage is proportional to the magnetic field of the recorded magnetic impulse.

Figure 7(e) shows the direct current voltage envelope developed at the output of the rectifier 156 of Figure 3. Figure 7(f) shows the amplification effect on the amplifier 160 of Figure 3 of the control voltage shown graphically in Figure 7(e).

Figure 7(g) shows graphically a mixture of two voltages of differing frequency, whose amplitudes are proportional to original single voltage elements as shown in Figure 7(e). Figure 7(h) shows four consecutive time intervals of "bursts" of complex signal resultant at the output of the systems shown in both Figure 1 and Figure 3.

In Figure 7(h) it will be noted that a change in the complexity of the signal occurs at the end of a time interval, and that within the time interval the frequency and amplitude remains constant for each voltage element of the complex signal, reflecting the time interval of operation of the magnetic generator during activation by the recorded impulse for a single sequence of signals recorded on the drum 114 produced by a predetermined rotary movement of the switch 104 in Figure 1. While the mixture shown in Figure 7(h) will result in some heterodyne action in practice, this action will be sufficiently uniform over the frequency range used in practice, to make no substantial change in the net amplitude of each individual signal in the complex "burst" as related to the others within a given time interval, and fidelity can thus be expected to be maintained within acceptable limits.

Figure 8 is a diagrammatic illustration of another form of the invention. An input signal as previously described supplied at 101 is first amplified by means of a conventional amplifier 300, is then rectified at 301 and filtered at 302 to provide a direct current voltage component of the original signal to act as a control voltage for controlling the amplification of an amplifier 303. A local oscillator 304 is caused to vary in frequency by means of a control generator 305 whose output voltage may be sinusoidal or of a sawtooth variety in which the voltage rises to a peak and then drops back to zero at a periodic rate, this periodic variation being used to vary the capacitance, inductance or resistance in the local oscillator 304 by means of well known techniques of circuitry and design to cause the frequency output of the local oscillator 304 to vary periodically in coincidence with the variation of the control generator 305.

The output of the local oscillator 304 while varying periodically in frequency, will be uniform in amplitude, and is conducted to the amplifier 303 where its amplitude is caused to vary in proportion to the amplitude of the rectified input signal from the filter 302 by means of well known circuitry controlling the cathode, grid and screen or plate voltages of the amplifier 303 either separately or in combination. The output of the amplifier 303 will thus consist of a frequency or phase-modulated carrier whose amplitude has been varied in direct proportion to the amplitude of the input signal 101. This complex signal is then conducted from the amplifier 303 through a push-pull power amplifier of conventional design 307, where in addition to power amplification the signal is divided into alternately consecutive signal components each of which is then conducted separately to recording heads 308 and 309 in two separate recording channels. Each of these two channels is identical in its operation except that the two channels alternate as to time intervals of operation, the reasons for which will become apparent in the subsequent description. For simplicity, however, the detailed operations of a single channel will be described.

The signal component from the push-pull amplifier 307 is conducted to the magnetic recording head 308 which is thus actuated and causes a magnetic recording to be made on the endless magnetic recording tape 310 mounted on a suitable mechanism, such as roller wheels 311. The tape is held under tension by the spring 312 acting on one of the rollers 311 and is moved intermittently by an intermittent drive mechanism 313 to be described in greater detail. The intermittent drive mechanism 313 is actuated by a voltage impulse from the push-pull driver amplifier 315 of conventional design whose original impulse source comes from the control generator 305. The generator 305 thus controls both the periodic variation in frequency of the local oscillator 304 and the operation of the intermittent drive mechanism 313 on alternate cycles as provided by the push-pull amplifier 315 and thus automatically synchronizes the relationship between operation of the local oscillator and operation of the intermittent drive system. The output signal component of the amplifier 307 is synchronized for example by a simple delay network including a capacitor and resistor with the output pulse of the driver amplifier 315 in such a manner that when the recording head 308 is actuated, the intermittent drive 313 is inoperative, while during the next subsequent cycle the recording head 308 is inoperative and the intermittent drive 313 operates to move the magnetic recording tape 310.

As the endless tape 310 moves around its mounting in intermittent fashion, it is directed through a raceway or guide 316 as it passes by a repeat head 317 to be described in detail, which is actuated by the signal recorded on the endless intermittently moving tape 310 and then re-records on an endless magnetic recording tape 318 supported on rollers 319. The tape is moved in a direction opposite to that of tape 310 at a constant rate of speed by a synchronous motor 320 or other constant speed motive device. The signal originally recorded on the intermittently moving tape 310 is thus transferred to the constant speed tape 318 which because of the speed differential between the two tapes thus "spreads out" or widens the original recorded signal in a uniform manner.

A playback head 321 is actuated by the recorded signal on the constant speed tape 318 and the resultant signal is conducted to a mixer 322 of conventional design, where it is mixed in alternative cycles with the output signal from the second of the two channels including recording head 309 and is thence conducted through the common amplifier 323 to the output and external load 324.

Erase heads 331 of standard design are installed in proximity to all of the moving magnetic tapes in the apparatus of Figure 8 at appropriate locations as shown, to erase recorded signals whose purpose has been served and to provide a "cleared" tape for subsequent recording.

Recording channel #1 including recording head 308 and channel #2 including recording head 309 are identical in construction. The recording head 309 receives alternate signal components from the power amplifier 307 and is thus actuated when the recording head 308 of channel #1 is inoperative. Upon actuation, the recording head 309 records a magnetic signal on the endless magnetic recording tape 324 when it is at rest, thus recording by superposition all of the elements of the signal during the alternate cyclic period of time when the recording head 309 is in operation. The tape 324 is moved intermittently by the intermittent drive mechanism 325 which is in turn alternately actuated by the common driver amplifier 315. The tape 324 moves past the raceway or guide 326 and actuates the repeat head 327 whose output is recorded on the constant speed tape 328 which is driven by the synchronous motor 329 or by other constant speed motive power. The signal recorded on the constant speed tape 328 passes by the playback head 330 whose output is conducted to the conventional mixer 322 where it is mixed in alternate cycles with the output signal from channel #1, and is thence conducted through the common amplifier 323 to the output and external load 324.

It will be noted than when channel #1 is recording, the moving tape 324 of channel #2 is in motion, while when channel #2 is recording, the moving tape 310 of channel #1 is in motion. These actions are continuously alternative, and are so timed with respect to each other and to the other common circuit parameters, that each complete cyclical variation of the local oscillator 304 is subsequently alternately recorded on a stationary portion of magnetic recording tape by magnetic superposition, and progressively differing elements of amplitude controlled but frequency-varying voltages are thus mechanically mixed by each of the two channels alternately.

It will be noted further that after the initial signals have been recorded on their respective intermittently moving tapes, they are then each re-recorded on a continuously moving tape which process has the net effect of mechanically widening the initial recorded signal, thus increasing its time of duration and at the same time lowering the overall frequency of the complex signal component. Upon alternate mixture of the two signals from the playback heads 321 and 330, in the common mixer 322 the net signal is a continuously moving complex low frequency signal for presentation to the external circuit.

It will be understood that the apparatus of Figure 8 is exemplary only and that mechanical and electrical variations are within the scope of the invention. For example, in place of endless magnetic recording tapes magnetic record wheels or drums could be used either separately or to some extent in combination with a common drive mechanism. In addition, the desired results can be accomplished by means of certain other known electronic or mechanical systems for providing storage and mixture of information signal components. Also additional channels may be employed.

To provide an example showing the capacity of the system illustrated in Figure 8, assume an input signal with a maximum repetition rate of 4,000,000 elements per second. A suitable carrier frequency range is chosen for the local oscillator 304, for example from 4 to 5 megacycles per second and it is caused by the control generator to sweep through this frequency range at a rate, for example, of 5000 "sweeps" per second. Each sweep will cause an identical variation, on a progressive basis, of the frequency of the oscillator 304 and this signal will be caused to vary in amplitude in the amplifier 303 at a rate of 800 input signal variations in amplitude per "sweep." The push pull amplifier 307 will divide the resultant signal into 2500 "sweeps" per second, per channel. Each channel is so synchronized as to provide for magnetic recording of alternate "sweeps" from the amplifier 307 creating on stationary portions of magnetic recording tape a complex signal at a rate of 2500 per second, per channel. When these recorded signals are subsequently extended in width and electrically mixed, a continuous external signal is formed whose complex component will contain a mixture of 800 elements per "burst" interval, each element within a burst represented by an alternating voltage having a frequency differing from that of every other element. The frequency of succeeding elements will increase or decrease uniformly. The burst rate (rate of change) is 5000 "bursts" per second which is well within the range for recording on inexpensive disc recordings or transmittal over telephone lines or other common carriers.

It will be understood the circuit capacity of the system of Figure 8 can be designed for any specific constants applicable to service usage. It will also be understood that two or more sets of apparatus can be used in parallel or in series, to provide a common complex output signal of lower frequency from a single or a multiple of input signals to the system.

Figures 9 through 13 illustrate several components suitable for use in the above described systems. Figure 9 illustrates a magnetic recording head capable of a higher and more uniform frequency response than the presently-available conventional magnetic recording or playback heads of comparable cost. One side of a signal to be recorded supplied at 332 is connected to a metallic electrode 333 which forms one plate of a condenser, while the other side of the signal source shown grounded at 334, is connected to a metallic stud 335 which may also be part of a raceway or guide which forms the other plate of the condenser. A magnetic recording tape, 336 shown as a strip of tape, serves as the dielectric of the condenser. The electrode 333 is mounted in a suitable case 337. The case 337 and the stud are mounted (by means not shown) in fixed positions with respect to each other. The electrode 333 is so constructed as to provide for a maximum concentration of electric charge upon activation at that point nearest to the dielectric tape, and includes a stud-like member extending at right angles to the dielectric tape, the end of the stud being rounded to provide a point of electrical concentration of energy. Other forms may be employed to provide a means for electrical concentration adjacent to the magnetic dielectric tape 336. Upon activation by means of a signal supplied at 332 and 334, the plates of the condenser 333 and 335 become charged and create an electrostatic field in the intervening space. Since this space is filled principally by the magnetic recording tape 336 which acts as the dielectric, the magnetic particles of the tape 336 become reoriented in proportion to the electrical strength of the actuating signal. If the tape 336 is moved, either constantly or intermittently as described above successive electric fields in the condenser 333 and 335 will result in successive mechanical disturbances or recordings in the tape 336.

The stud 333 preferably extends across the full width of the tape 336 thus distributing the energy of recording over a practical area of record track. This type of recording head may also be used to record several tracks in parallel on a wide tape.

Figure 10 illustrates an alternative recording or playback head whose design is applicable to the systems described previously. In the apparatus of Figure 10 an actuating signal supplied at 332 and 334 is connected to two metallic electrodes 338 and 339 between which is located a piezo-electric or other similar element 340 all of which are held firmly in position within the mounting case 341 and are suspended by means of damping material 342 of soft rubber or other material with suitable damping characteristics. The crystal 340 is cemented to the front electrode 339. The back electrode 338 is held against the crystal 340 by a ring 342a. The front electrode 339 is formed of material of high magnetic retentivity and is highly magnetized as a permanent magnet. A roller 343 maintains the magnetic recording tape 336 within reasonable distance from the end of the stud 339a which forms a part of the magnetized electrode 339. Upon actuation by means of the input signal, the properties of the crystal 340 mounted as described above, are such that it will move in proportion to the amplitude of the actuating signal voltage, thus driving the magnetized electrode 339 and the stud 339a in a piston-like manner towards the magnetic tape 336 while the damping material 342 will tend to resist this action and will upon removal of the actuating signal voltage return the combined electrode and crystal away from the plane of the magnetic tape 336. Since the electrode 339 including stud 339a is highly magnetized, its alternating motion with respect to the magnetic tape 336 creates alternately greater and lesser disturbances in the magnetic coating of the tape 336 thus resulting in a mechanical reorientation of the magnetic particles in the coating in proportion to the amplitude of the actuating signal voltage.

While either of the components described in connection with Figures 9 and 10 may be used as recording heads, it is apparent that they may also be used as playback heads or magnetic generators by reorientation of their parts as necessary to those applications.

Figures 11 and 12 show various aspects of a "repeat" head used in connection with the apparatus of Figure 8 to provide a means of re-recording a magnetic recording or of transferring a magnetic recording from one magnetic tape to another. While this process is well known in the field of recording, and does not per se form a part of the present invention, it will be described briefly for purposes of clarification. A plate 344 is mounted together with shorter plates 345 and 346 to form a laminated plate system wherein the plates 344 and 345 are fabricated of metal of low magnetic retentivity. These laminations are formed in a bundle as shown and are then made the core of a magnetic coil formed by insulated wire windings 347 and 348. Both coils 347 and 348 are identical in fundamental structure, and are connected together. One of the plates 344 is so oriented that its end furthest from the coil 347 is located adjacent to a magnetic record (not shown) whose motion causes a magnetic field to magnetize the plate 344 and to induce a voltage in the coil 347. The second coil 348 is so oriented that the end of its plate 344 is located adjacent to a magnetic recording track (not shown). Upon actuation of the "playback" portion of the unit, since the coils 347 and 348 are connected together the "record" portion will become activated and create a magnetic field which will magnetize its core and the plate 344 and will thereupon create a facsimile of the original recorded signal. In certain cases it may be necessary to insert a conventional amplifier between the "playback" and "record" heads in order to increase the strength of the signal to be re-recorded.

Figures 14 and 15, respectively, are side and end views of an intermittent drive mechanism used in connection with the apparatus of Figure 8. While intermittent drive mechanisms are well known in the engineering field, it is described herein to demonstrate the principles applicable to its use in connection with the present invention. A drive wheel 349 which is a part of a system for moving tape or film or a record drum is rotatably mounted on a shaft 350. A hub 351 integral with wheel 349 and a brake 352 pivotally mounted on a stationary stud 353 at one end are provided with cooperating braking surfaces maintained in frictional contact by a tension spring 355 one end of which is attached to the brake 352 and the other to a fixed stud 356.

Gear teeth 357 are cut on one rim of the drive wheel 349 which cooperate with a drive lever 358 pivotally mounted on the free end of lever 359. Springs 360 and 361 urge the lever 358 against teeth 357. The lever 358 is urged away from the gear teeth 357 by a solenoid 362 which in turn is activated by an external signal applied at 363. Each time the relay coil 362 is activated, the drive wheel 349 is advanced by the distance equivalent to one tooth of the gears 357. Thus the drive wheel will rotate intermittently at a rate dependent upon the rate of activation of the relay 362 which is in turn dependent upon the external signal rate, which may be provided by numerous mechanical or electronic interrupted voltage devices.

Several systems are known to provide feasible intermittent motion rates up to and including 5000 per second.

Figure 16 is a series of graphs showing the electrical forms of the signal in various specific parts of my invention as described in connection with Figure 8. Figure 16 is graph of the change of frequency of the local oscillator 304 for two cycles of variation with time, *t*. Figure 16(*b*) is a graph of a sawtooth voltage waveform provided by the control generator 305 for two cycles of variation with time. While each such cycle produces a frequency change as in Figure 16(*a*), it will be recalled that the push-pull driver amplifier 315 divides its output to conduct alternately subsequent cycles to the intermittent drives 313 and 325.

Figure 16(*c*) is a graph depicting the constant amplitude, varying-frequency output of the oscillator 304 while Figure 16(*d*) is a graph of the amplified, rectified, and filtered input signal 101 as it is used to vary the amplification of the amplifier 303 of Figure 8.

Figure 16(*e*) is a graph illustrating the characteristics of the signal at the output of the amplifier 303 in Figure 8, showing the variation in amplitude provided by the signal of Figure 16(*d*) acting upon the signal of Figure 16(*c*).

Figure 16(*f*) is a graph of the electrical equivalent of the signal of Figure 16(*e*) after it has been mechanically mixed by recording on the tape of one channel in Figure 8.

Figure 16(*g*) is a graph illustrating the electrical form of the signal recorded on the tape 318 and shows how the signal recorded on tape 310 has been "widened" time-wise, thus reducing its frequency while retaining the relative amplitudes as well as the relative frequencies of the complex signal. Figure 16(*g*) is also illustrative of the form of the output signal 324 of the apparatus of Figure 8 for a single time cycle as previously defined in connection with the description of Figure 8.

Figure 17 shows at 371 the magnetic form of the complex signal in several sequences as recorded on the intermittent tape 310 of one channel. Figure 18 illustrates at 372 the mechanical form of one segment 371 after it has been transferred from the intermittently moving tape 310 to the constant-motion tape 318 as described in connection with Figure 8.

It will be noted at this point that the systems of encoding or creating complex signal forms as described in connection with Figures 1, 3 and 8, together with amplifying descriptions in connection with Figures 7 and 16, disclose two forms of a basic system for achieving the stated objects of the invention. In the first form (Figures 1 and 3) an original signal is first broken up into sequential elements which are then successively delayed in transmission and converted simultaneously into differing elements of alternating voltage of progressively differing frequency and of a time of existence equal to the sum of the times of existence of the original sequential elements, to form a "burst" whose rate of occurrence is significantly lower than the original rate of the individual elements. In the second form (Figure 8), the original signal is the same as in the first form but during a specified time sequence the original signal modifies the amplitude of a frequency or phase-modulated carrier, a sequence of which is then recorded by superposition and thereby provides a mechanical mixture of progressively differing elements of alternating voltage, and is then mechanically "widened" or "stretched" to provide a resultant signal whose components are at a lower frequency but whose relative amplitude is unchanged and whose time of existence is equal to the sum of the times of existence of the original elements of the sequence.

Thus both forms of the invention provide a resultant output signal which consists of a mixture of elements of alternating voltage which are progressively different in frequency within a specified time sequence or "burst," but maintain by means of their relative amplitudes the information contained in the original signal in each case, on a basis of progressively increasing (or decreasing) frequency for each element of the "burst."

Referring now to Figure 19 the apparatus there shown by block diagram is a preferred apparatus by which the complex signal provided in the apparatus of Figures 1, 3 and 8 is decoded or broken down into a facsimile of the original high frequency (or high repetition rate) signal. A signal similar to the output signal 324 of Figure 8 or 138 of Figures 1 and 3 is applied at 401 from a record playback head, a telephone line or other common carrier, or directly from the apparatus illustrated in Figures 1, 3 or 8. A conventional amplifier 402 amplifies the signal input to a level sufficient to provide a strong usable signal for the system. The signal is then conducted to a variable filter 403 which is tunable over the range of frequency elements present in the input signal and is designed to be continuously operative in sweeping through the frequency range contained within each "burst" in sequence. The output of the variable filter 403 is then conducted to a clipper circuit 404 or to another suitable circuit of well known type which removes extraneous noise and unwanted interfering background signal, and the resultant signal is then conducted to a conventional rectifier or detector 405 whose output delivered at 406 will consist of successive elements of direct current voltage whose amplitude will vary in accordance with the original encoded information.

Figure 20 illustrates a simplified circuit schematic diagram applicable to the system outlined in Figure 19. The output signal 407 of the amplifier 402 in Figure 19 is conducted to the filter coil 408 in Figure 20. The output of the filter coil 408 is tuned by means of a variable condenser 409 whose capacity is varied continuously between minimum and maximum by the motor drive 410 by conventional means. The characteristics of the filter coil 408 and of the condenser 409 are selected so as to provide a sharp resonant condition in the secondary winding of the filter coil 408 varying as to frequency admittance by variation in the capacity of the condenser 409, the whole in combination providing circuit parameters covering the frequency range of the elements contained within each "burst" of the incoming signal 407. In addition, the speed of variation in capacity of the condenser is so adjusted that the filter action of the filter coil and condenser 408 and 409 in combination will "sweep" over the range of frequency elements in the input signal 407 within the time of existence of the "burst," and is adjustable in order to provide a means for synchronization of the filter action peak with the incoming signal 407 in order that as the complex incoming signal 407 is presented to the filter, the filter will be progressively sensitive to successively alternate frequencies and will thus select (and hence pass) progressively differing frequency elements from the incoming signal 407 in sequence. A fixed condenser 412 is connected across the output of the variable filter to act as a clipper to bypass unwanted noise and extraneous signals, and the remaining signal is conducted through the rectifier 413 to the output 414 where consecutive impulses of direct current will provide a facsimile of the original high frequency (or high repetition) signal as it appeared prior to conversion.

It should be understood that the filter action described above in connection with Figure 20 does not necessarily represent the most efficient form of this part of my invention, in that transformers or inductances, crystals, and condensers may be combined in well known circuitry to provide an exceedingly selective variable filter for specific applications. In addition, the condenser 409 and its drive system 410 and 411 are shown herein in Figure 20 for simplicity of description. Several well known components are available by which the capacity of a condenser can be made to vary between minimum and maximum at rates up to and including 10,000 cycles per second, and such components would obviously be suitable for use with the present invention where its expense is warranted.

It should be further understood that the filter action described above in connection with Figure 20 may be effected by varying inductance, capacity, resistance, or a combination of all three. It is also apparent that the clipper action described in connection with the discriminator 404 of Figure 19 and the condenser of Figure 20 can be accomplished in a variety of ways, including the use of vacuum tube clipper circuits of well known design which limit the transmission of a signal to those desirable peaks required.

Hence, a variety of individual components can be utilized in accordance with the invention for separating from a complex signal, consisting of numerous elements of alternating voltage, those elements in sequence which are intended by the overall system design to provide a sequence of signals in orderly orientation from the complex mixture.

Figure 21 is a series of graphs illustrating the actions of the decoding system as described in connection with Figure 19. Figure 21(a) illustrates two time sequences of complex signal as presented to the input 401 (Figure 19) and Figure 21(b) is a graph of the filter action of the variable filter, 403 (Figure 19). Figure 21(c) shows in graph form how a clipper circuit "blanks out" unwanted or undesirable portions of a signal as described. Figure 21(d) shows graphically the alternating voltage signal after filtering and clipping in Figures 19 and 20 prior to detector or rectifier action. Figure 21(e) is a graph illustrative of the direct current output signal whose consecutive impulses vary in amplitude in successive relation to the elements of information contained within the signal source "bursts."

The decoding principles outlined above are susceptible of execution in simple, inexpensive apparatus which may be used as separate "converters" or may be combined with associated equipment designed to use the resultant signal. It also appears likely that the principles outlined can be related closed to mass production techniques in providing "playback" equipment on a wide scale at low unit cost.

As stated above, the methods and apparatus of the present invention, in one of their primary applications, that of handling television signals, are effective because of their ability to produce a signal comprising a series of bursts whose rate of occurrence is significantly lower than the repetition rate or frequency of the incoming signal. However, since the burst rate is independent of the frequency of the incoming signal, the burst rate ray be equal to or greater than the frequency of other types of incoming signals.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United State Letters Patent is:

1. Apparatus for handling a signal in the form of electrical impulses occurring in sequence and having a first bandwith, comprising; switch means for dividing said signal into successive groups of impulses; means for reorienting each impulse in each said group from sequential to simultaneous existence in time; said last named means including means for converting each impulse within such group to an alternating current signal of a different frequency for each impulse within a given group, with the amplitude of each alternating current signal being proportional to the amplitude of the impulse it represents and the time of existence of each such alternating current signal being greater than the time of existence of the impulse to which it corresponds and equal to the sum of the times of existence of the impulses in the given group; and means for mixing the alternating current signals corresponding to the impulses in each group to form a series of complex signal bursts, one for each group handled; said switch, reorienting and conversion means operating on the impulses in successive groups in the same manner so that the relationship between impulses and alternating current signals is the same from burst to burst; said switch means and reorienting means operating at such a rate as to produce a repetition rate of said bursts having a bandwidth materially less than said first bandwidth.

2. An apparatus as set out in claim 1 wherein said reorienting means comprises a storage medium, an input means for transferring information to said storage medium, and an output means for deriving information from said storage medium, said impulses being handled by said input means, said storage medium and said output means, each impulse in any one group of impulses being stored by said storage means a different period of time than each other impulse in this same group.

3. An apparatus as set out in claim 2 wherein said output means includes generating means which produces said alternating current signals.

4. An apparatus as set out in claim 2 including means for generating said alternating current signals, said output means controlling said generating means to control the production of said alternating current signals.

5. An apparatus as set out in claim 2 wherein said storage medium is a magnetic medium, said input means comprises a plurality of recording heads equal in number to at least one for each impulse in a group, and said output means comprises a plurality of pick-up heads equal in number to at least one for each recording head.

6. An apparatus as set out in claim 5 wherein said storage medium comprises a rotatable magnetic drum having said recording heads mounted longitudinally therealong and said pick-up heads arranged longitudinally therealong, said recording heads and pick-up heads being associated in pairs positioned in common planes normal to the axis of said drum.

7. Apparatus for handling a signal in the form of electrical impulses occurring in sequence and having a first bandwidth, comprising; switch means for dividing said signal into a series of groups of impulses; means for sequentially storing each group of impulses and reorienting the impulses in each group into simultaneous existence; said last named means including means for simultaneously generating for each impulse in a given group a different alternating current signal having an amplitude which is a function of the amplitude of the impulse it represents and a time duration equal to the sum of the times of duration of the impulses in the given group; and means for mixing said alternating current signals corresponding to the impulses in each group to form a series of complex signal bursts, one for each group handled; said switch, reorienting and generating means operating on the impulses in successive groups in the same manner so that the relationship between impulses and alternating current signals is the same from burst to burst; said switch means and reorienting means operating at such a rate as to produce a repetition rate of said bursts having a bandwidth materially less than said first bandwidth.

8. An apparatus as set out in claim 7 wherein said means for accomplishing said sequential storing comprises means for sequentially recording the impulses in a group and the groups of impulses; and said means for simultaneously generating said alternating current signals is controlled by recorded impulses.

9. Apparatus for handling a signal in the form of electrical impulses occurring in sequence and having a first bandwidth, comprising; switch means for dividing said signal into successive groups of impulses; means for reorienting each impulse in each said group from sequential to simultaneous existence in time, said last named means including means for converting each impulse within each such group to an alternating current signal whose amplitude is a function of the amplitude of the impulse to which it corresponds; means for generating a plurality of carrier signals of progressively different frequencies, one such carrier signal for each impulse in a given group; means for modifying and controlling the amplitude of said carrier signals under control of said alternating current signals so as to produce carrier signals of a different frequency for each impulse within a given group, with the amplitude of each carrier signal being a function of the amplitude of the impulse it represents and the time of existence of each such carrier signal being equal to the sum of the times of existence of the impulses in the given group; and means for mixing said modified carrier signals to form a series of complex signal bursts, one for each said group handled; said switch, reorienting, modifying and controlling means operating on and in response to the impulses in successive groups in the same manner so that the relationship between impulses and carrier signals is the same from burst to burst; said switch means and reorienting means operating at such a rate as to produce a repetition rate of said bursts having a bandwidth materially less than said first bandwidth.

10. An apparatus as set out in claim 7 including means for separating said alternating current signals in each burst; and means for detecting each separated alternating current signal to provide a sequential series of electrical impulses corresponding in amplitude to the amplitude of corresponding alternating current signals.

References Cited in the file of this patent

UNITED STATES PATENTS

| | | |
|---|---|---|
| 2,098,956 | Dudley | Nov. 16, 1937 |
| 2,312,897 | Guanella et al. | Mar. 3, 1943 |
| 2,364,210 | Guanella | Dec. 5, 1944 |
| 2,406,349 | Buhrendorf | Aug. 27, 1946 |
| 2,411,683 | Guanella | Nov. 26, 1946 |
| 2,517,808 | Sziklai | Aug. 8, 1950 |
| 2,559,644 | Landon | July 10, 1951 |
| 2,657,253 | Bedford | Oct. 27, 1953 |